United States Patent Office 2,967,200
Patented Jan. 3, 1961

2,967,200

PREPARATION OF KETOXIMES

Robert Everett Foster, Hockessin, Del., and Arthur Francis Kirby, Woodbury, N.J., assignors to E. I. du Pont de Nemours and Company, Wilmington, Del., a corporation of Delaware No Drawing. Filed Jan. 28, 1959, Ser. No. 789,477

11 Claims. (Cl. 260—566)

The present invention relates to a process for the preparation of ketoximes from the corresponding secondary nitro alkanes and cycloalkanes. More particularly, the present invention relates to a process for the preparation of ketoximes by catalytic hydrogenation of the corresponding secondary nitro alkanes and cycloalkanes. This application constitutes a continuation-in-part of our co-pending application, Serial No. 584,201, filed May 11, 1956, now abandoned, and assigned to the present assignee.

Ketoximes, especially cyclohexanone oxime, are important chemical intermediates, for example, in the preparation of amides and cyclic amides (lactams). Cyclohexanone oxime, especially, has found widespread use in the preparation of ε-caprolactam, a valuable product used in synthetic fibers, resins, and plasticizers.

Heretofore, ketoximes have been prepared from secondary nitro alkanes and cycloalkanes by various methods including chemical reduction and catalytic hydrogenation. However, chemical reduction of these nitro compounds involves the use of costly reagents such as hydroxylamine, zinc and acetic acid, and stannous chloride and hydrochloric acid. The catalytic hydrogenation processes used heretofore have not been completely satisfactory because the formation of the oxime is accompanied by the formation of substantial amounts of less-valuable by-products such as alkyl or cycloalkyl hydroxylamines or amines. Attempts have been made to suppress the formation of these by-products by effecting the hydrogenation in the vapor phase or by the use of promoters or additives. However, these methods have not been effective inasmuch as in some cases the conversions are poor and, in others, prolonged reaction periods are required.

Accordingly, an object of the present invention is to provide an improved process for the production of ketoximes. Another object of the present invention is to provide an economical process for the production of ketoximes from the corresponding secondary nitro alkanes and cycloalkanes. A still further object of the present invention is to provide a process in which secondary nitro alkanes and cycloalkanes are hydrogenated selectively to form the corresponding ketoximes in good yields without the formation of substantial amounts of less valuable by-products. Other objects will become apparent as the invention is further described.

We have found that the foregoing objects may be achieved when we carry out the catalytic hydrogenation of a secondary nitro alkane or cycloalkane in the presence of lead, either in the elemental or combined form.

In accordance with the process of the present invention, a ketoxime is obtained when a secondary nitro alkane or cycloalkane, e.g., nitrocyclohexane, is hydrogenated in the presence of lead, in the elemental or combined form, and a hydrogenation catalyst at a temperature ranging from about 60° C. to the decomposition temperature of the nitro compound.

The following examples serve to illustrate specific embodiments of the method of carrying out the process of the present invention. However, they will be understood to be illustrative only and not to limit the invention in any manner. The parts in the examples are parts by weight, and the percentages refer to percent by weight, except where otherwise indicated.

Example 1

Nitrocyclohexane (258 parts), 0.25 part of lead acetate trihydrate, 500 parts of water, and 2.58 parts of a palladium-on-acetylene black catalyst containing 2.5 parts of Pd per 100 parts of support were charged to a stirred autoclave. Hydrogen was introduced under an initial pressure of 500 p.s.i.g., and the mixture was heated at 140° C. In 80 minutes the pressure had dropped 200 p.s.i.g. after which no further pressure drop occurred. The product was cooled, removed from the autoclave, and extracted with chloroform. After filtration of the solids from the chloroform extract, the extract was analyzed by infrared spectroscopy. Cyclohexanone oxime was obtained in the amount of 174.9 parts (77.4% conversion and yield), whereas only 16.2 parts of cyclohexylamine and 8.6 parts of cylohexanone were obtained.

The above procedure was repeated with the exception that the lead compound was omitted. In this case only 55.1 parts of cyclohexanone oxime was obtained (24.4% conversion and yield), whereas 141 parts of cyclohexylamine and 5.5 parts of cyclohexanone were obtained.

As is shown by the above example, the presence of lead in the reaction system results in a marked degree of selectivity so as to give chiefly oxime. We have found that this selectivity is afforded by lead compounds as well as by elemental lead. The following examples illustrate the effectiveness of different lead compounds in different hydrogenation systems.

Example 2

The following experiments were carried out according to the procedure of Example 1. In each case 258 parts of nitrocyclohexane, 600 parts of water, and 2.58 parts of a palladium-on-acetylene black catalyst containing 5 parts of Pd per 100 parts of support were used. The reaction temperature was 160° C.

| Expt. No. | Lead Compound (Parts) | Products (Parts) | | |
|---|---|---|---|---|
| | | Cyclohexanone Oxime | Cyclohexylamine | Cyclohexanone |
| 1 | Lead Nitrate (2.0). | 176 (77.9% conversion and yield). | 19.7 | 8.6 |
| 2 | Lead Oxide (1.4). | 179 (79.2% conversion and yield). | 14.9 | 17.2 |
| 3 | Lead Dioxide (2.0). | 171.8 (75% conversion and yield). | 13.8 | 13.7 |
| 4 | Lead Sulfate (2.0). | 172.7 (76.4% conversion and yield). | 23.8 | 15.5 |
| 5 | Lead Carbonate (1.5). | 179.4 (79.4% conversion and yield). | 14.2 | 10.6 |
| 6 | None | 26.2 (11.6% conversion and yield). | 135.8 | 22.3 |

Example 3

In the following experiments, 12.9 parts of nitrocyclohexane was hydrogenated at 1000 p.s.i.g. by the procedure described in Example 1. Methanol (20 parts) was used as a diluent in each experiment. The reaction conditions and results are summarized in the following table.

| Expt. No. | Lead Compound (Parts) | Catalyst (Parts) | Temp. (°C) | Cyclohexanone Oxime Parts | Percent Yield |
| --- | --- | --- | --- | --- | --- |
| 7 | Lead acetate (0.2) | 65% Reduced Ni-on-kieselguhr (1.0) | 100 | 2.4 | 30 |
| 8 | Lead oxide (0.5) | ......do...... | 100 | 2.4 | 30 |
| 9 | None | ......do...... | 100 | 0 | 0 |
| 10 | Lead acetate (0.1) | Copper chromite (1.0) | 140 | 5.4 | 48 |
| 11 | Lead oxide (0.1) | ......do...... | 140 | 6.1 | 54 |
| 12 | None | ......do...... | 140 | 1.9 | 20 |
| 13 | Lead acetate (0.1) | 60% Reduced Co-on-kieselguhr (2.0) | 140 | 3.0 | 33 |
| 14 | None | ......do...... | 140 | 0 | 0 |

The effectiveness of elemental lead as a means of providing selectivity for oxime production is illustrated by the following example.

*Example 4*

Two experiments were carried out according to the procedure of Example 1 with the exception that no lead compound was added. Instead, in the one experiment 400 parts of lead in the form of a bar was placed in the autoclave, and in the other experiment the autoclave was lined with 1000 parts of lead. In each experiment, 2.58 parts of a palladium-on-acetylene black catalyst containing 5 parts of Pd per 100 parts of support was used. In the experiment in which a lead bar was added to the autoclave, 157.1 parts of cyclohexanone oxime (69.5% yield), 39 parts of cyclohexylamine, and 9 parts of cyclohexanone were obtained. In the experiment in which the autoclave was lined with lead, 169.5 parts of cyclohexanone oxime (75% yield), 29.7 parts of cyclohexylamine, and 7.8 parts of cyclohexanone were obtained.

As is shown by the above examples, the lead may be introduced into the reaction system of the present process by the addition of a lead compound which may be soluble or insoluble in the reaction medium and, therefore, depending on the solubility, will be present either in the dissolved state, dispersed in the reaction medium, or deposited at the bottom of the reactor. As is further shown, elemental lead alternatively may be introduced by various means. Still alternatively, the lead may be introduced into the reaction system on a suitable substrate, for example, the substrate which may be used as the catalyst support. This procedure may be effected, for example, by treating the catalyst with a lead salt and is illustrated by the following examples.

*Example 5*

A solution of 1 part of lead acetate trihydrate in 10 parts of distilled water was added to 10 parts of an acetylene black-supported mixed palladium-platinum-ferric oxide catalyst (4.5 parts palladium, 0.5 part platinum, 5.0 parts iron per hundred parts of support) suspended in 100 parts of distilled water. The resulting mixture was stirred for 10 minutes at room temperature and then for 40 minutes over a 100° C. water bath. The treated catalyst was filtered by suction, washed with 400 parts of distilled water, and dried. Analysis showed that lead was present in the amount of 3% by weight of the catalyst.

One-half part of the treated catalyst was added to a mixture of 13 parts of nitrocyclohexane and 20 parts of methanol, and hydrogen was passed into the mixture at an initial pressure of 450 p.s.i.g. The reaction temperature was maintained at about 110–125° C., and the hydrogenation was allowed to proceed until approximately the theoretical amount of hydrogen for the conversion of the nitrocyclohexane to the oxime was absorbed. At the end of this time, about 35 minutes, the reactor was cooled and then vented. The catalyst was removed from the reaction mixture by filtration and was washed free of solids with hot cyclohexane. Water and methanol were removed from the filtrate by azeotropic distillation with cyclohexane, and the cyclohexane solution was cooled and then analyzed. Cyclohexanone oxime was obtained in the amount of 4.4 parts (81% yield), whereas only 0.4 part of cyclohexylamine was formed.

The procedure was repeated under similar conditions (temperature, 110–127° C.; initial pressure, 485 p.s.i.g.; reaction time, 11 minutes) with the exception that the catalyst used was lead-free. The oxime was obtained in the amount of only 2.4 parts (42% yield), whereas 3.0 parts of cyclohexylamine was formed.

*Example 6*

In two experiments, the procedure of Example 5 was repeated with the exception that, in one experiment, an acetylene black-supported mixed palladium-ferric oxide catalyst (5 parts palladium, 5 parts iron per 100 parts support) which had been treated with lead acetate was substituted for the catalyst of Example 5 and, in the second experiment, a lead acetate-treated palladium-on-acetylene black catalyst (5 parts Pd per 100 parts support) was substituted for the catalyst of Example 5. The catalysts were treated according to the procedure described in Example 5. Analysis of the cyclohexane solution showed that cyclohexanone oxime was obtained in 59% yield in the first experiment and in 44% yield in the second experiment.

*Example 7*

One-half part of a palladium-on-calcium carbonate catalyst (5 parts Pd per 100 parts support) which had been treated with lead acetate according to the procedure described in Example 5 was added to a mixture of 13 parts of nitrocyclohexane in 20 parts of methanol, and hydrogen was passed into the mixture. The hydrogenation was carried out at 110–135° C. and a pressure of 475–375 p.s.i.g. The total reaction time was 25 minutes. After completion of the hydrogenation, the reactor was cooled and then vented and the reaction mixture was worked up by the method described in Example 5. Analysis of the cyclohexane solution showed that a 60% yield of cyclohexanone oxime (4.3 parts) was obtained. No cyclohexylhydroxylamine was found.

The procedure was repeated under similar conditions (temperature, 110–126° C.; pressure, 450–300 p.s.i.g.; and reaction time, 35 minutes) with the exception that the catalyst used was lead-free. The reaction mixture was worked up by the method described in Example 5, with the exception that a precipitate (cyclohexylhydroxylamine) which formed upon cooling of the cyclohexane solution was filtered out, dried, and weighed. A yield of cyclohexanone oxime of less than 9% (<0.4 part) was obtained, whereas a 48% yield of cyclohexylhydroxylamine was obtained.

*Example 8*

One and one-half parts of a platinum-on-carbon catalyst (1 part Pt per 100 parts support) which had been treated with lead acetate according to the procedure described in Example 5 was added to a reactor containing 13 parts of nitrocyclohexane and 20 parts of methanol. Hydrogen then was introduced into the reactor. The maximum pressure was 475 p.s.i.g., the reaction temperature was 110–125° C., and the hydrogenation was allowed to proceed until approximately the theoretical amount of hydrogen for the conversion of the nitrocyclohexane to the oxime was absorbed. Then, the reactor was cooled and vented and the contents worked up by the method given in Example 5. The yield of cyclohexanone oxime was determined by analysis to be 29% (1.8 parts).

In another experiment, 1½ parts of the same platinum-on-carbon catalyst, but lead-free, was added to the nitrocyclohexane-methanol mixture, and hydrogen was introduced. The hydrogenation was carried out at a maximum pressure of 480 p.s.i.g. and a temperature of 110–133° C. until approximately the theoretical amount of hydrogen for the conversion of the nitrocyclohexane to the oxime was absorbed. Then the reactor was cooled and vented and the contents worked up by the method described in Example 5. An 18% yield (0.9 part) of cyclohexanone oxime, as determined by analysis, was obtained.

*Example 9*

A series of experiments was made in which 13 parts of nitrocyclohexane was hydrogenated in 20 parts of methanol and in the presence of 0.5 part of various lead-treated and lead-free hydrogenation catalysts. The lead treatment of the catalysts was effected by the procedure described in Example 5. In each case, the catalyst contained 5 parts of Pd per 100 parts of support. The hydrogenations were allowed to proceed until approximately the theoretical amount of hydrogen for the conversion of nitrocyclohexane to the oxime was absorbed. The reaction conditions and results are summarized in the following table.

filtrate was distilled at reduced pressure (20 mm.) to separate the products. A 42% yield (4.7 parts) of cyclopentanone oxime was obtained.

*Example 11*

The procedure of Example 10 was repeated with the exception that 18 parts of 2-nitropropane was substituted for the nitrocyclopentane and the reaction temperature was 110–123° C. Acetone oxime in 30% conversion (4.3 parts) was obtained.

The following examples illustrate a still alternative method of introducing the lead into the reaction system. This method comprises using a lead compound as the catalyst support.

*Example 12*

Nitrocyclohexane (258 parts), 2.58 parts of palladium-on-lead sulfate (5 parts Pd per 100 parts PbSO$_4$), and 600 parts of water were charged to a stirred autoclave. Hydrogen was introduced under an initial pressure of 500 p.s.i.g., and the mixture was heated to 160° C. In 100 minutes the hydrogen uptake ceased. The product was cooled, removed from the autoclave, and was worked up according to the method described in Example 1. The product contained 149.2 parts of cyclohexanone oxime (66% conversion and yield), 38.4 parts of cyclohexylamine, and 7.7 parts of cyclohexanone.

*Example 13*

The procedure of Example 12 was repeated except that 2.58 parts of palladium-on-lead carbonate (5 parts of Pd per 100 parts PbCO$_3$) was substituted for the palladium-on-lead sulfate. The product consisted of 155.9 parts of cyclohexanone oxime (69% conversion and yield), 36.6

| Expt. No. | Catalyst | Temp. (° C.) | Max. Pressure (p.s.i.g.) | Cyclohexanone Oxime | |
|---|---|---|---|---|---|
| | | | | Parts | Percent Yield |
| 15 | Lead-treated Pd-on-C | 110–158 | 475 | 2.1 | 34 |
| 16 | Lead-free Pd-on-C | 110–120 | 470 | 0.4 | 9 |
| 17 | Lead-treated Pd-on-CaSO$_4$ | 110–129 | 465 | 3.1 | 54 |
| 18 | Lead-free Pd-on-CaSO$_4$ | 110–126 | 485 | 0.4 | 7 |
| 19 | Lead-treated Pd-on-Al$_2$O$_3$ | 110–143 | 450 | 0.9 | 21 |
| 20 | Lead-free Pd-on-Al$_2$O$_3$ | 110–126 | 460 | 0 | 0 |
| 21 | Lead-treated Pd-on-Cr$_2$O$_3$ | 110–131 | 460 | 0.9 | 36 |
| 22 | Lead-free Pd-on-Cr$_2$O$_3$ | 110–152 | 465 | 0 | 0 |
| 23 | Lead-treated Pd-on-BaCO$_3$ | 110–132 | 400 | 2.2 | 54 |
| 24 | Lead-free Pd-on-BaCO$_3$ | 110–127 | 400 | 0 | 0 |

*Example 10*

Hydrogen at an initial pressure of 400 p.s.i.g. was introduced into a reactor containing 23 parts of nitrocyclopentane, 20 parts of methanol, and 0.5 part of the lead-treated catalyst described in Example 5. The hydrogenation was allowed to proceed at 110–130° C. until approximately the theoretical amount of hydrogen for the conversion of the nitrocyclopentane to the oxime was absorbed. At the end of this time, the reactor was cooled and then vented, and the reaction mixture was removed. The mixture was filtered to remove the catalyst, and the parts of cyclohexylamine, and 17.2 parts of cyclohexanone.

The amount of lead present in the reaction system of the present process can vary within wide limits as is shown by the following example.

*Example 14*

The procedure used in all of the experiments tabulated was that described in Example 1. In the table, the catalyst composition is described in terms of percent of metal for convenience; the numerals actually refer to parts of metal per 100 parts of support.

| Expt. No. | Nitrocyclohexane (Parts) | Water (Parts) | Lead Compound (Parts) | Pb/Nitrocyclohexane, Parts Ratio (p.p.m.) | Catalyst (Parts) | Products (Parts) | | |
|---|---|---|---|---|---|---|---|---|
| | | | | | | Cyclohexanone Oxime | Cyclohexylamine | Cyclohexanone |
| 25 | 25.8 | 30 | Lead Acetate Trihydrate (0.006) | 125 | 5% Pd-on-acetylene black contg. 1% Mg as promoter (0.096) | 12.9 (57% conversion and yield) | 7.6 | 2.7 |
| 26 | 25.8 | 30 | None | | do | 0 | 16.0 | 3.0 |
| 27 | 25.8 | 90 | Lead Acetate Trihydrate (0.030) | 640 | Pd-Fe$_2$O$_3$-on-acetylene black (5% Pd, 5% Fe) (0.258) | 13.3 (59% conversion and yield) | 6.7 | 2.6 |
| 28 | 25.8 | 60 | Lead Acetate Trihydrate (0.118) | 2,500 | do | 15.6 (69% conversion and yield) | 3.4 | 2.3 |
| 29 | 258 | 600 | Lead Oxide (1.4) | 5,000 | 5% Pd-on-acetylene black contg. 1% Mg as promoter (2.58) | 173.1 (76.6% conversion and yield) | 14.4 | 14.9 |
| 30 | 258 | 600 | Lead Nitrate (3.0) | 7,250 | 5% Pd-on-acetylene black (2.58) | 163.8 (72.5% conversion and yield) | 18.8 | 11.9 |
| 31 | 25.8 | 60 | Lead Acetate Trihydrate (1.7) | 36,000 | Pd-Fe$_2$O$_3$-on-acetylene black (5% Pd, 5% Fe) (0.258) | 13.4 (59% conversion and yield) | 1.2 | 3.5 |
| 32 | 25.8 | 60 | None | | do | 0 | 19.0 | 4.0 |

The use of a diluent is not critical to the process of the present invention. Furthermore, when a diluent is used, the amount of diluent can vary within wide limits without affecting the selectivity of the reaction.

*Example 15*

The following experiments were carried out according to the procedure described in Example 1. Lead oxide was used instead of lead acetate trihydrate. The reaction temperature was 160° C. and the initial pressure was 500 p.s.i.g. The percent of metal in the catalyst formulation refers to parts of metal per 100 parts of support.

| Expt. No. | Nitro-cyclo-hexane (Parts) | Water (Parts) | Lead Oxide (Parts) | Catalyst (Parts) | Products (Parts) | | |
|---|---|---|---|---|---|---|---|
| | | | | | Cyclohexanone Oxime | Cyclo-hexyl-amine | Cyclo-hexanone |
| 33 | 2,050 | None | 5.6 | 2.5% Pd-on-acetylene black contg. 1% Mg as promoter (20.5). | 1,350 (74.7% conversion and yield). | 166 | 79 |
| 34 | 2,050 | None | 11 | 5% Pd-on-acetylene black contg. 1% Mg as promoter (20.5). | 1,320 (73% conversion and yield). | 116 | 113 |
| 35 | 585 | 1,465 | 11 | ___do___ | 391.5 (77% conversion and yield). | 36.4 | 25.0 |
| 36 | 820 | 1,230 | 11 | ___do___ | 542.4 (75% conversion and yield). | 63.4 | 20.2 |

The following example illustrates the use of different diluents in the process of the present invention.

*Example 16*

Nitrocyclohexane (13 parts) was hydrogenated in the presence of 0.5 part of the lead-treated catalyst described in Example 5. The hydrogenation was allowed to proceed until approximately the theoretical amount of hydrogen for the conversion of the nitrocyclohexane to the oxime was absorbed. The reaction conditions and results are summarized in the following table.

| Expt. No. | Diluent (Parts) | Temp. (° C.) | Max. Pressure (p.s.i.g.) | H₂ Pressure Drop (p.s.i.g.) | Cyclohexanone Oxime | |
|---|---|---|---|---|---|---|
| | | | | | Parts | Percent Yield |
| 37 | H₂O (25) | 110–137 | 445 | 140 | 6.8 | 72 |
| 38 | Cyclohexane (20). | 110–125 | 445 | 90 | 1.7 | 40 |
| 39 | Methanol (20) H₂O (5). | 110–128 | 450 | 155 | 3.8 | 59 |
| 40 | None | 110–125 | 445 | 150 | 5 | 60 |

When Experiment 37 was repeated with the use of a lead-free catalyst, only 0.4 part of cyclohexanone oxime was obtained (6% yield).

The following examples illustrate the use of different temperatures and pressures in the present process.

*Example 17*

Nitrocyclohexane (580 parts) was hydrogenated according to the procedure of Example 1 in the presence of 1.32 parts of lead acetate trihydrate and 5.7 parts of a palladium-on-acetylene black catalyst containing 5 parts of Pd and 1 part of magnesium (as a promoter) per 100 parts of support. The initial hydrogen pressure was 450 p.s.i.g. and the reaction temperature was 190–200° C. Cyclohexanone oxime was obtained in the amount of 267 parts (52.9% conversion and yield), whereas only 52.6 parts of cyclohexylamine and 47.2 parts of cyclohexanone were obtained.

*Example 18*

Hydrogen at an initial pressure of 1800 p.s.i.g. was passed into a reactor containing 13 parts of nitrocyclohexane, 20 parts of methanol, and 0.2 part of a palladium-on-calcium carbonate catalyst (5 parts Pd per 100 parts support) which had been treated with lead acetate according to the procedure described in Example 5. The hydrogenation was allowed to proceed at 110–126° C. until approximately the theoretical amount of hydrogen for the conversion of the nitrocyclohexane to the oxime was absorbed. Then, the reactor was cooled and vented and the contents worked up by the method described in Example 5. Analysis of the cyclohexane solution showed that 5.1 parts (52% yield) of cyclohexanone oxime was obtained.

*Example 19*

Hydrogen at an initial pressure of 235 p.s.i.g. was introduced into a reactor containing 13 parts of nitrocyclohexane, 20 parts of methanol, and 1 part of a palladium-on-calcium carbonate catalyst (5 parts Pd per 100 parts support) which had been treated with lead acetate according to the procedure described in Example 5. The hydrogenation was allowed to proceed at 94–100° C. until approximately the theoretical amount of hydrogen for the conversion of the nitrocyclohexane to the oxime was absorbed. At the end of this time, the reactor was cooled and vented and the contents worked up by the method described in Example 5. Analysis of the cyclohexane solution showed that a 56% yield (5.7 parts) of cyclohexanone oxime was obtained.

The critical feature of the process of the present invention is the presence of lead in the reaction system. As is illustrated in the examples, lead in the elemental or combined form provides a marked degree of selectivity for the hydrogenation of secondary nitro alkanes and cycloalkanes to the corresponding oximes. Thus, the examples show that, under the conditions used, when lead is present in the reaction system, the yield of oxime is increased and the formation of other products is suppressed. Furthermore, in contrast to the hydrogenation processes of the prior art, the process of the present invention affords good conversions of the nitro compounds to the oximes in short reaction times.

We have found that the chemical nature of the lead in the system and the manner in which the lead is maintained in the system are not critical features of the present process. Thus, as has been illustrated in the examples, the source of lead may be a soluble or insoluble lead compound or elemental lead maintained in the system in any convenient way. For example, a lead compound which is soluble in the reaction medium may be introduced directly into the reaction system and will therefore be present in the dissolved state (e.g., Example 1); or the hydrogenation catalyst may be treated with the soluble lead compound so that the lead compound is introduced into the system on the catalyst (e.g., Examples 5 to 11). Alternatively, a lead compound which is insoluble in the reaction medium may be introduced directly into the reaction system and will therefore be dispersed in the system or deposited at the bottom of the reactor (e.g., Example 15); or the hydrogenation catalyst may be treated with the insoluble lead compound so that the lead compound is introduced into the system on the catalyst. Still alternatively, the source of lead may be elemental lead itself introduced into the system in any convenient form, for example, as granular lead, a bar of lead, or a lead liner in the reactor (e.g., Example 4). Still other modifications in the method of introducing the lead into the system are equally effective in the present process. For example, a lead compound may be used in combination with the catalyst support or may be used singly as the catalyst support (e.g., Examples 12 and 13).

A wide variety of lead compounds are preferable for providing the desired selectivity in the present hydrogenation process because of their availability and ease of handling. These include such compounds as the acetate, chlorate, nitrate, formate, citrate, benzoate, stearate, bromide, chloride, fluoride, oxides, sulfate, and carbonate of lead, as well as the lead salt of the secondary nitro alkane or cycloalkane.

The lead concentration in the hydrogenation system of the present process is not a critical factor and can vary within wide limits. While the particular lead concentration which will give optimum conversions to ketoxime will depend on such reaction variables as temperature, pressure, the catalyst concentration, and the amount of diluent which may be present, the selectivity afforded by lead is maintained over a wide concentration range, as is illustrated in Examples 4 and 14. In general, we have found that concentrations of at least 100 parts of lead per million parts of nitro alkane or cycloalkane are effective in providing the desired selectivity in the present process. As may be seen from Example 14 (Experiments 25, 27, 28, and 31), lead in concentrations greatly above the minimum requirements is equally effective and has no deleterious effect on the present process. Therefore, the upper limit for lead concentration will be dictated essentially by economic factors.

While a large variety of catalysts may be used in the catalytic hydrogenation of secondary nitro alkanes or cycloalkanes to produce ketoximes, we prefer to use palladium, platinum, reduced nickel, reduced cobalt, or copper chromite inasmuch as these represent readily available and active hydrogenation catalysts. The metals may be used in finely divided form or supported by a suitable material, e.g., carbon, calcium or barium carbonate, calcium or barium sulfate, alumina, silica, kieselguhr, chromic oxide, magnesium oxide, lead sulfate, and lead carbonate. Acetylene black-supported palladium, for example, may be prepared by adding aqueous sodium bicarbonate to a slurry of acetylene black in water, adding to the slurry a solution of palladium chloride in sodium chloride solution, and heating the mixture to 95° C. under agitation to precipitate the palladium, probably as palladium hydroxide. Furthermore, as is known, hydrogenation catalysts may contain promoters or activators intended, for example, to improve the reaction rate. The use of a promoted catalyst is illustrated in Examples 14 and 15. This catalyst, magnesium-promoted palladium-on-acetylene black, may be prepared by the method described above for the preparation of acetylene black-supported palladium, with the exception that a water solution of magnesium acetate and, thereafter, sodium hydroxide are added to the slurry of acetylene black in water prior to the addition of the sodium bicarbonate and palladium chloride solution. This treatment precipitates magnesium hydroxide on the support.

The amount of catalyst employed depends upon such reaction variables as temperature, pressure, duration of run, etc. In general, a catalyst concentration of one part of catalyst metal per million parts of nitro alkane or cycloalkane is operable. However, since the rate of hydrogenation is influenced by the catalyst concentration, we prefer to employ a catalyst concentration of about 500 parts of catalyst metal per million parts of nitro alkane or cycloalkane in order to decrease the reaction time. An excess of catalyst is not detrimental to the process of the present invention because the excess catalyst has no harmful effects. Moreover, after completion of the hydrogenation, the catalyst may be removed from the reaction mixture by filtration and reused.

It will be understood that the yields shown with various catalysts do not necessarily represent the optimum yields obtainable with each catalyst inasmuch as the conditions for optimum yield vary considerably with different catalysts. The examples do illustrate, however, that even at less than optimum conditions, substantial improvement in conversion to oxime as contrasted to formation of by-products is produced by the inclusion of lead in the reaction system.

As is illustrated by Examples 15 and 16, the use of a diluent is not a critical feature of the process of the present invention. However, for handling and control purposes, the nitro alkane or cycloalkane may be mixed with a suitable diluent. Such diluents include water, lower-molecular-weight alkanols, e.g., methanol, ethanol, and isopropanol, water-alkanol mixtures, and cyclohexane. The amount of diluent used has no significant effect on the present process, as is illustrated by Examples 14 and 15.

The present process may be carried out at temperatures within the range of 60° C. and the decomposition temperature of the nitro alkane or cycloalkane. The use of lower temperatures is impractical because of the greatly increased reaction time thereby required, whereas the use of higher temperatures causes decomposition and resultant yield losses. Temperatures within the range of 100° to 200° C. were found to be especially effective.

In effecting the hydrogenation, pressures ranging from atmospheric to the maximum permitted by mechanical limitations of the available equipment can be employed, i.e., 1–1000 atmospheres. Although entirely satisfactory yields of the oximes can be obtained when atmospheric pressure is used, the use of higher pressures is advantageous because thereby the reaction rate is increased and the reaction time is decreased.

As may be seen by reference to the examples, the time required for the completion of the hydrogenation is dependent upon such reaction variables as temperature, pressure, catalyst concentration, etc. Therefore, the time required for the completion of the hydrogenation is a controllable factor rather than a limiting factor.

The process of the present invention has been illustrated by the production of cyclohexanone oxime, cyclopentanone oxime, and acetone oxime. Equally feasible, however, is the production of other ketoximes from the corresponding nitro cycloalkanes and secondary nitro alkanes. For examples, nitrocycloheptane can be converted to cycloheptanone oxime by the present process, and 2-nitrobutane can be converted to butanone oxime also by the present process.

Although the process has been illustrated as a batchwise process, the effecting of the process in a continuous manner is fully feasible. For example, the mixture of the nitro alkane or cycloalkane, lead, and catalyst may be introduced continuously into a reactor into which hydrogen is continuously passed, while the hydrogenation product is continuously removed.

The invention has been described in detail in the foregoing. It will be apparent to those skilled in the art that many variations are possible without departure from the scope of the invention. We intend, therefore, to be limited only by the following claims.

We claim:

1. A process for the preparation of a ketoxime which comprises hydrogenating a nitro compound selected from the group consisting of nitro cycloalkanes and secondary nitro alkanes, the reaction mass being in contact with lead in an amount of at least 100 parts of lead per million parts of said nitro compound, and a hydrogenation catalyst selected from the group consisting of palladium, platinum, reduced nickel, reduced cobalt, and copper chromite catalysts, at a temperature within the range of 60° C. and the decomposition temperature of said nitro compound.

2. A process according to claim 1, wherein said lead is added as elemental lead.

3. A process according to claim 1, wherein said lead is added as lead oxide.

4. A process according to claim 1, wherein said lead is added as lead acetate.

5. A process according to claim 1, wherein said hydrogenation catalyst is palladium-on-acetylene black.

6. A process according to claim 1, wherein said hydrogenation catalyst is magnesium-promoted palladium-on-acetylene black.

7. A process according to claim 1, wherein the hydrogenation is carried out at a pressure within the range of 1 and 1000 atmospheres.

8. A process for the preparation of cyclohexanone oxime which comprises hydrogenating nitrocyclohexane, the reaction mass being in contact with lead in an amount of at least 100 parts of lead per million parts of nitrocyclohexane, and a hydrogenation catalyst selected from the group consisting of palladium, platinum, reduced nickel, reduced cobalt, and copper chromite catalysts, at a temperature within the range of 60° C. and the decomposition temperature of nitrocyclohexane.

9. In a process for the preparation of cyclohexanone oxime by contacting nitrocyclohexane with hydrogen in the presence of a hydrogenation catalyst, the improvement which comprises carrying out the process while the reaction mass is in contact with lead.

10. A process for the preparation of a ketoxime which comprises hydrogenating a nitro compound selected from the group consisting of nitro cycloalkanes and secondary nitro alkanes at a temperature within the range of 60° C. and the decomposition point of the nitro compound, the reaction mass being in contact with a hydrogenation catalyst selected from the group consisting of palladium and platinum catalysts containing 1-3% by weight of lead.

11. A process for the preparation of cyclohexanone oxime which comprises hydrogenating nitrocyclohexane at a temperature within the range of 60° C. and the decomposition point of the nitrocyclohexane, the reaction mass being in contact with a hydrogenation catalyst selected from the group consisting of palladium and platinum catalysts containing 1-3% by weight of lead.

References Cited in the file of this patent

UNITED STATES PATENTS

| | | |
|---|---|---|
| 2,420,382 | Robertson | May 13, 1947 |
| 2,423,180 | Doumani et al. | July 1, 1947 |
| 2,681,938 | Lindlar | June 22, 1954 |
| 2,711,427 | Christian | June 21, 1955 |
| 2,768,206 | Kaasemaker | Oct. 23, 1956 |

FOREIGN PATENTS

| | | |
|---|---|---|
| 667,552 | Great Britain | Mar. 5, 1952 |
| 280,466 | Switzerland | Apr. 16, 1952 |
| 1,021,058 | France | Nov. 26, 1952 |